(12) United States Patent
Takase et al.

(10) Patent No.: US 7,023,799 B2
(45) Date of Patent: Apr. 4, 2006

(54) LEAKY BUCKET TYPE TRAFFIC SHAPER AND BANDWIDTH CONTROLLER

(75) Inventors: Masayuki Takase, Kokubunji (JP);
Norihiko Moriwaki, Kokubunji (JP);
Mitsuhiro Wada, Fujisawa (JP);
Hiroaki Kasahara, Fujisawa (JP);
Takahiko Kozaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 962 days.

(21) Appl. No.: 10/079,583

(22) Filed: Feb. 22, 2002

(65) Prior Publication Data

US 2003/0123390 A1    Jul. 3, 2003

(30) Foreign Application Priority Data

Dec. 28, 2001    (JP)    ............... 2001-399076

(51) Int. Cl.
*H04L 12/56*    (2006.01)

(52) U.S. Cl. ................... 370/230.1; 370/235.1

(58) Field of Classification Search ............... 370/230, 370/230.1, 232, 233, 235, 235.1
See application file for complete search history.

(56) References Cited

U.S. PATENT DOCUMENTS 6,247,061 B1 *  6/2001  Douceur et al. ............ 709/240
6,490,248 B1 * 12/2002  Shimojo ..................... 370/229
6,646,986 B1 * 11/2003  Beshai ..................... 370/230.1
6,836,475 B1 * 12/2004  Chaskar et al. ............. 370/351
6,901,052 B1 *  5/2005  Buskirk et al. ............. 370/235
6,920,109 B1 *  7/2005  Yazaki et al. ............. 370/230.1
2003/0063562 A1 *  4/2003  Sarkinen et al. ............ 370/230

FOREIGN PATENT DOCUMENTS

| JP | 2-239748 | 2/1990 |
| JP | 2000-332787 | 5/1999 |
| JP | 2001-168869 | 12/1999 |

* cited by examiner

*Primary Examiner*—Min Jung
(74) *Attorney, Agent, or Firm*—Reed Smith LLP; Stanley P. Fisher, Esq.; Juan Carlos A. Marquez, Esq.

(57) ABSTRACT

A traffic shaper comprises a bandwidth controller 40 having a plurality of leaky bucket units 41-1 to 41-n prepared in correspondence with buffer memories 20-1 to 20-n, and an output queue designation unit 43 for specifying a buffer memory from which a packet is to be read out. Each of the leaky bucket units 41 has a level counter 416 for decrementing the count value at a predetermined rate, and a level increaser 411 to 417 for increasing the count value of the level counter by a value proportional to the product of the length of a transmitted packet and a unitary increment value which is variable depend on the current count value of the level counter.

16 Claims, 14 Drawing Sheets

FIG. 8A

| LEVEL RANGE | α | |
|---|---|---|
| 86526 ~ | 6/10 | ~Z-10 |
| 77418 ~ 86525 | 6/9 | ~Z-9 |
| 68310 ~ 77417 | 6/8 | ~Z-8 |
| 59202 ~ 68309 | 6/7 | ~Z-7 |
| 50094 ~ 59201 | 1 | ~Z-6 |
| 40986 ~ 50093 | 6/5 | ~Z-5 |
| 31878 ~ 40985 | 6/4 | ~Z-4 |
| 22770 ~ 31877 | 2 | ~Z-3 |
| 13662 ~ 22769 | 3 | ~Z-2 |
| 4554 ~ 13661 | 6 | ~Z-1 |

| LEVEL RANGE | α | |
|---|---|---|
| 81972 ~ | 6/10 | ~Z-10 |
| 72864 ~ 81971 | 6/9 | ~Z-9 |
| 63756 ~ 72863 | 6/8 | ~Z-8 |
| 54648 ~ 63755 | 6/7 | ~Z-7 |
| 45540 ~ 54647 | 1 | ~Z-6 |
| 36432 ~ 45539 | 6/5 | ~Z-5 |
| 27324 ~ 36431 | 6/4 | ~Z-4 |
| 18216 ~ 27323 | 2 | ~Z-3 |
| 9108 ~ 18215 | 3 | ~Z-2 |
| 0 ~ 9107 | 6 | ~Z-1 |

412

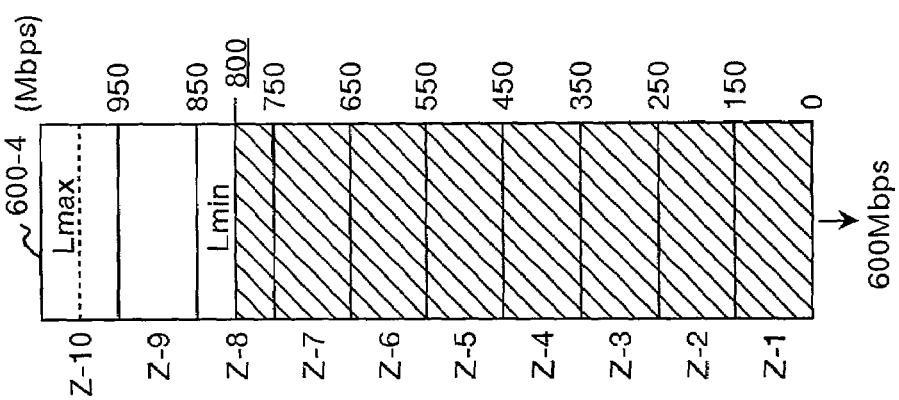
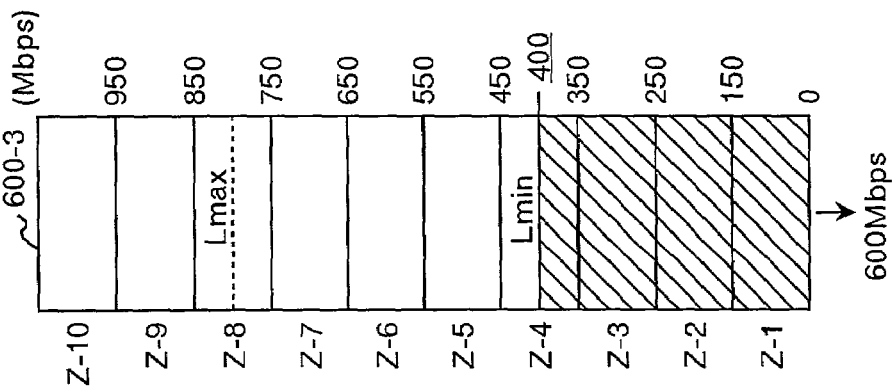
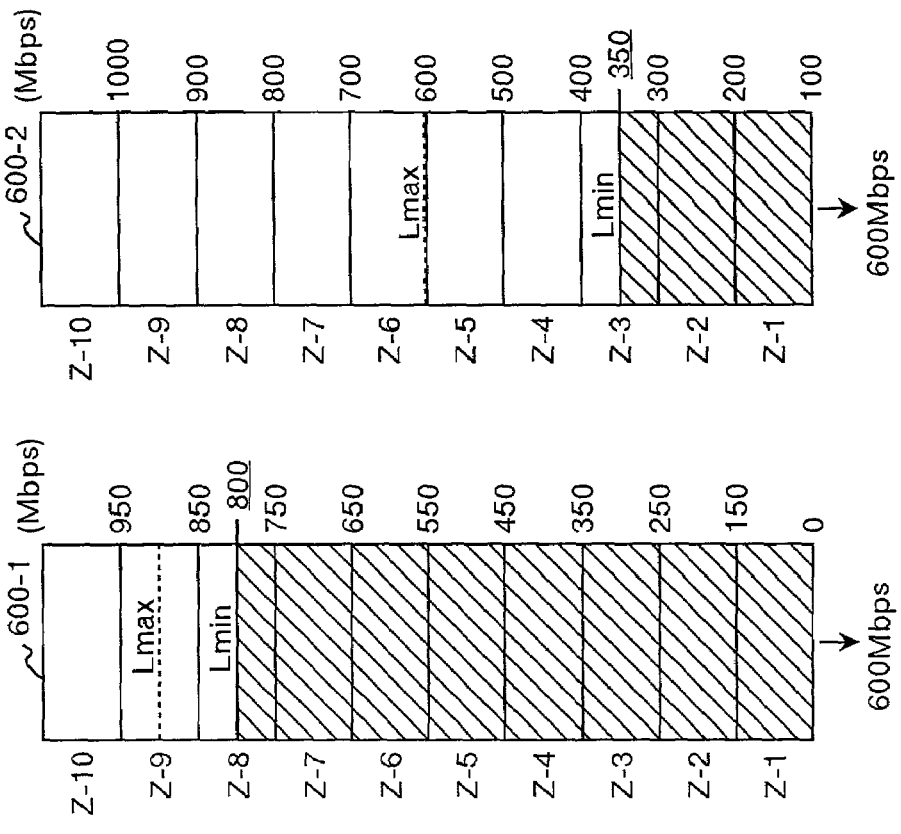

LEAKY BUCKET TYPE TRAFFIC SHAPER AND BANDWIDTH CONTROLLER

BACKGROUND OF THE INVENTION (1) Field of the Invention

The present invention relates to a traffic shaper and a bandwidth controller for controlling the bandwidth of a received variable-length packet and, more particularly, to a traffic shaper and a bandwidth controller for a variable-length packet, for transmitting a received packet temporarily stored in a buffer memory to an output circuit in conformity with a minimum guaranteed bandwidth preliminarily designated, by a bandwidth control using a leaky bucket.

(2) Description of the Related Art

In association with increase in the number of Internet users, the traffic amount in a communication network is sharply increasing. The current Internet communication is performed in the best effort fashion in which an information transfer amount of each user is determined in accordance with an unoccupied state of a line. However, when broadband lines such as FTTH (Fiber To The Home) are spread to houses and communication service of a large transfer information amount such as video streaming service increases, communication service which guarantees the minimum bandwidth to each user becomes necessary.

In traffic on the Internet, different from conventional voice traffic in a public network, burst transmission data is generated from a user terminal and a packet flow (traffic) becomes discontinuous. Consequently, it is unnecessary to always assure a fixed line bandwidth to each user prior to communication. To effectively use the bandwidth of a communication line, it is desired to multiplex traffic of a plurality of users on a single communication line and perform a communication control of guaranteeing the minimum guaranteed bandwidth within the range of a maximum allowable bandwidth preliminarily contracted for each user on traffic actually generated. The minimum guaranteed bandwidth and the maximum allowable bandwidth correspond to the minimum cell rate (MCR) and the peak cell rate (PCR) in the asynchronous transfer mode (ATM).

In this case, the minimum guaranteed bandwidth can be assigned, for example, so that the whole bandwidth of a communication line is shared by plural user traffic multiplexed on the communication line. In the Internet in which communication is performed basically in the best effort fashion, it is not always necessary to set the maximum allowable bandwidth for each user. It is however desired to perform a bandwidth control such that, when the traffic volume of any of the users becomes below the minimum guaranteed bandwidth, the unoccupied bandwidth left in a communication lien can be fairly shared by users each having a traffic volume equal to or larger than the minimum guaranteed bandwidth.

As a conventional technique regarding the traffic shaper function of performing the above-described bandwidth control, for example, Japanese Unexamined Patent Publication No. 2001-168869 (prior art 1) discloses a bandwidth control method for an ATM network for controlling the MCR and PCR by applying a weighted round robin (WRR) method.

Japanese Unexamined Patent Publication No. 2-239748 (prior art 2) discloses a bandwidth control technique for ATM cells, using a leaky bucket. In the prior art 2, a counter is provided for each transfer channel. When a cell arrives at a queue, a value corresponding to the length of the arrived cell is added to the counter, and a value proportional to time elapsed from the arrival time of the immediately preceding cell is subtracted from the count value of the counter. In each counter, one threshold value is set. The cell transmission right is granted to a cell queue of a transmission channel whose count value becomes smaller than the threshold.

As an example of the traffic shaping technique for a variable-length packet, Japanese Unexamined Patent Publication No. 2000-332787 (prior art 3) discloses a packet transfer apparatus in which a high priority queue for storing packets for which the bandwidth has to be guaranteed and a non-priority queue for storing packets to be transmitted in an unoccupied bandwidth are provided in correspondence with each output line in a line interface unit connected to a public network. In the packet transmission apparatus, scheduled transmission time of the head packet of each queue is calculated according to a bandwidth to be guaranteed and the head packet is read out from the queue at the scheduled transmission time.

However, the above-described prior arts do not disclose a practical traffic shaping technique enabling a packet transfer in the minimum guaranteed bandwidth or more while effectively using an unoccupied bandwidth with respect to variable-length packets communicated on the Internet in conformity with the minimum guaranteed bandwidth preliminarily contracted. For example, since the control objects are ATM cells having a fixed length, the prior arts 1 and 2 cannot be applied as they are to the traffic of variable-length packets.

The prior art 3 guarantees the minimum bandwidth of priority packets by reading out the head packet from the high priority queue to transmit it to the output line at the scheduled packet transmission time, and assigning new scheduled transmission time to the next packet in the same high priority queue so as to keep the minimum guaranteed bandwidth. When packets of a predetermined amount or more are stored in the high priority queue, the prior art 3 prevents overflow of the queue by setting scheduled transmission time, which becomes immediately packet transmission time, to the next packet irrespective of the minimum guaranteed bandwidth. The packets stored in the non-priority queue obtain the transmission right when the high priority queue has no packet to be transmitted at the scheduled transmission time. These non-priority packets are transmitted to the output line by using idle time of the minimum bandwidth.

In the prior art 3, since packets are read out from the high priority queue which reaches the scheduled transmission time assigned to the head packet or from the high priority queue which has passed the scheduled transmission time as a rule, it is theoretically difficult to effectively use the unoccupied bandwidth which becomes available before the transmission scheduled time. Although the prior art 3 describes that the transmission bandwidth can be increased to the maximum allowable bandwidth when the number of packet transmission users decreases, there is no disclosure on a concrete control technique.

SUMMARY OF THE INVENTION

An object of the invention is to provide a traffic shaper capable of transferring variable-length packets while guaranteeing the minimum guaranteed bandwidth to each traffic and effectively using an unoccupied bandwidth of a communication line.

Another object of the invention is to provide a traffic shaper capable of making an unoccupied bandwidth of a communication line to be fairly shared by plural traffic.

Further another object of the invention is to provide a traffic shaper capable of transferring variable-length packets while guaranteeing the minimum bandwidth to each traffic and using an unoccupied bandwidth of a communication line within the maximum allowable bandwidth.

Further another object of the invention is to provide a leaky bucket type bandwidth controller capable of accurately detecting packet transmission timing to guarantee a preliminarily designated minimum bandwidth.

In order to achieve the objects, the invention provides a traffic shaper for transferring variable-length packets received from a plurality of input ports to one output port while guaranteeing preliminarily designated minimum bandwidths, comprising a plurality of buffer memories for temporarily storing the variable-length packets received from the input ports, a bandwidth controller for specifying a buffer memory from which a packet is to be read out, and a read controller for reading out a variable-length packet from a buffer memory specified by the bandwidth controller and transmitting the packet to the output port.

The bandwidth controller includes a plurality of leaky bucket units prepared in correspondence with the buffer memories, and an output queue designation unit for specifying a buffer memory from which a packet is to be read out, on the basis of difference values each indicating the difference between a level count value output from each of the leaky bucket units and a threshold corresponding to a preliminarily designated minimum guaranteed bandwidth.

Each of the leaky bucket units includes a level counter for decrementing the count value at a predetermined rate, and level raising means for increasing the count value of the level counter in response to reading out of a packet from a corresponding buffer memory, by a value proportional to the length of the packet.

More specifically, the output queue designation unit includes a plurality of level deviation detectors each for outputting a numerical value indicative of a difference value between the level count value output from one of the leaky bucket units and a threshold corresponding to the minimum guaranteed bandwidth, and a buffer selector for specifying a buffer memory from which a packet is to be read out on the basis of the difference values output from the level deviation detectors. Each of the level deviation detectors outputs zero as the difference value when the level count value output from the leaky bucket unit becomes equal to or smaller than the threshold. The buffer selector has a register for indicating a packet storage state in each of the buffer memories, validates output values from the level deviation detectors corresponding to buffer memories each of which stores at least one packet to be read out, and selects one minimum value among the validated difference values.

According to an embodiment of the invention, when the validated difference values include a plurality of same minimum values, the buffer selector selects one minimum value in a round-robin manner. Consequently, the transmission right can be granted sequentially to the buffer memories from which a packet is transmitted.

A feature of the invention resides in that each of the level raising means is supplied a variable unitary increment value which varies according to the level count value of the level counter, and the level raising means increases the count value of the level counter in accordance with the product of the unitary increment value and the packet length.

According to an embodiment of the invention, each of the leaky bucket units has an increment value table for indicating unitary increment values corresponding to a plurality of level zones defined within the range of the level count value of the level counter, and the level raising means increases the count value of the level counter in accordance with the product of the packet length and a unitary increment value corresponding to the level count value of the level counter in the increment value table.

According to a preferred embodiment of the invention, each of the plurality of leaky bucket units selectively uses one of increment value tables having different definitions of level zones according to the designated minimum guaranteed bandwidth so that the threshold corresponding to the minimum guaranteed bandwidth is located in an almost center portion of one of the level zones. In the increment value table, variable unitary increment values which increase step by step as the level count value of the level counter decreases are stored.

In the traffic shaper of the invention, by applying the variable unitary increment value, even if traffic is stopped and the level of the leaky bucket drops largely below the threshold, the level of the leaky bucket can be sharply raised when a newly arrived packet is read out from the buffer memory. Therefore, according to the invention, when the traffic temporarily stopped recovers, the level of the leaky bucket can be raised to a level higher than the threshold corresponding to the minimum guaranteed bandwidth in a short time, and the transmission right according to the minimum guaranteed bandwidth can be granted to each of the buffer memories.

Another feature of the invention resides in that the output queue designation unit of the bandwidth controller specifies a buffer memory, on the basis of the difference value from leaky buckets each having the level count value equal to or lower than the threshold corresponding to the preliminarily designated maximum allowable bandwidth.

According to the traffic shaper of the invention, a packet transmission right is granted to a buffer memory corresponding to a leaky bucket whose level count value has the minimum difference from the threshold determined by the minimum guaranteed bandwidth. Therefore, when the level count value becomes higher than the threshold determined by the minimum guaranteed bandwidth in all of the leaky buckets corresponding to the packet buffers each of which stores at least one packet to be read out, the packet transmission right is granted to the packet buffer whose level count value is closest to the threshold. Thus, traffic shaping at a rate over the minimum guaranteed bandwidth can be realized within the maximum allowable bandwidth.

Since the packet transmission right is assigned by using the minimum guaranteed bandwidth of each traffic as a reference, according to the invention, an unoccupied bandwidth in an output line obtained in a state where the minimum guaranteed bandwidth is satisfied by all the traffic can be fairly shared in proportional to the minimum guaranteed bandwidths of the traffic.

A bandwidth controller according to the invention includes a plurality of leaky bucket units prepared in correspondence with buffer memories, an output queue designation unit for specifying a buffer memory from which a packet is to be read out on the basis of a difference values each indicating the deference between a level count value output from one of the leaky bucket units and a threshold corresponding to a minimum guaranteed bandwidth preliminarily designated for each buffer memory, and a read controller for reading out one variable-length packet from a buffer memory specified by the output queue designation unit.

Each of the leaky bucket units includes a level counter for decrementing the count value at a predetermined rate, and level raising means for increasing the count value of the level counter, in response to reading out of a packet from a corresponding buffer memory, by a value proportional to the length of the packet. The level raising means increases the count value of the level counter in accordance with the product of a packet length and a variable unitary increment value which increases step by step as the level count value of the level counter decreases.

The other objects and features of the invention will become apparent from embodiments described hereinbelow with reference to the drawings.

BRIEF DESCRIPTION OF THE DRAWINGS

FIG. 8 is a diagram showing an example of a unitary increment (α) value table.

FIG. 12 is a diagram for explaining a status of a layered leaky bucket corresponding to each of input lines in the traffic shaper illustrated in FIG. 11.

DESCRIPTION OF THE PREFERRED EMBODIMENTS

Figure 1:
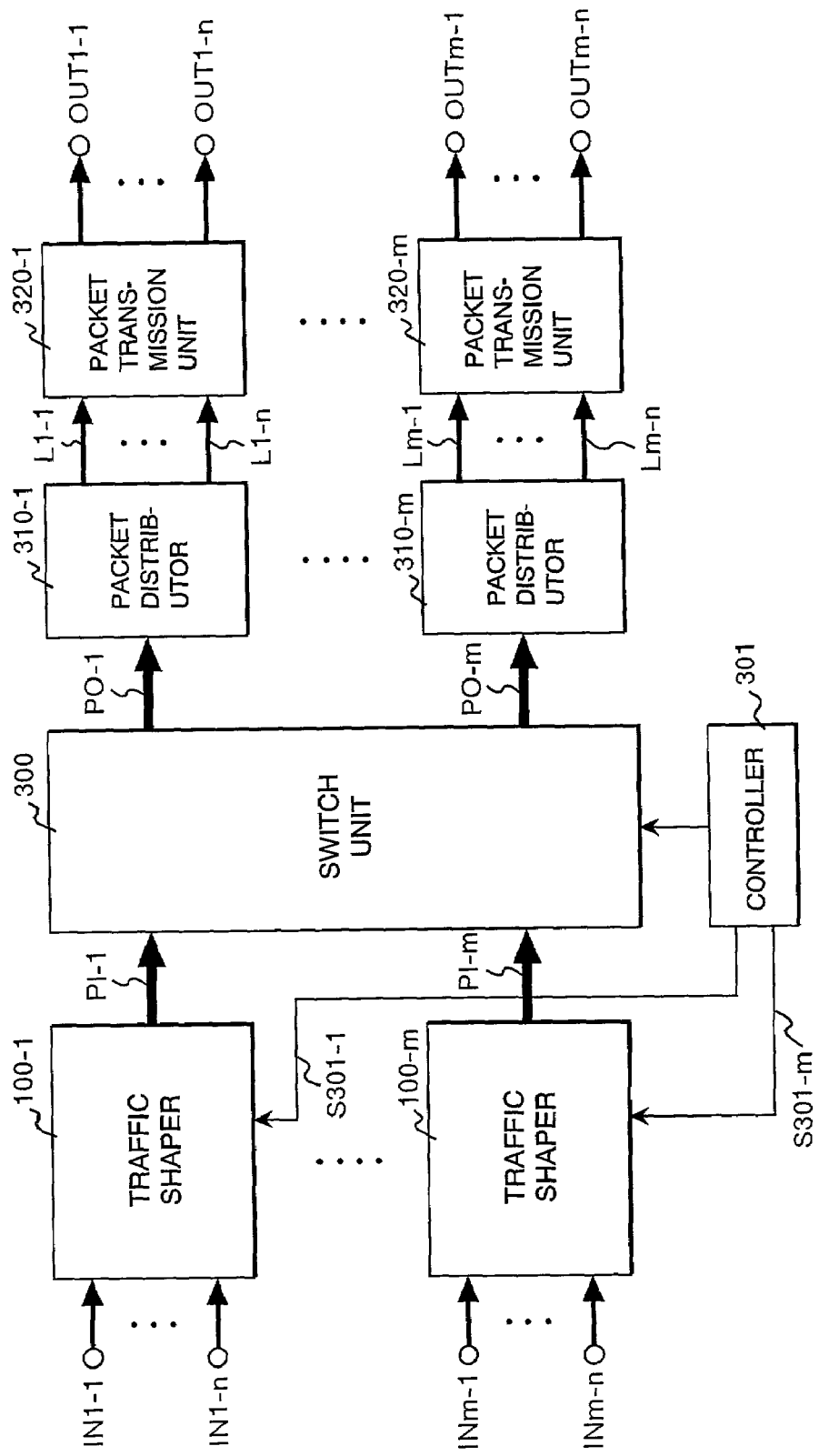
FIG. 1 is a diagram showing an example of a packet switching system to which a traffic shaper of the invention is applied.

FIG. 1 shows an example of a packet switching system to which a traffic shaper of the invention is applied.

The packet switching system includes, traffic shapers 100-1 to 100-m connected to input line groups IN1-1 to IN1-n and INm-1 to INm-n, respectively, a switch unit 300 for selectively transferring variable-length packets output from the traffic shapers 100-1 to 100-m to packet distributors 310-1 to 310-m in accordance with internal header information attached to each packet, packet transmission units 320-1 to 320-m connected to the packet distributors 310-1 to 310-m, respectively, and a controller 301 connected to the traffic shapers 100-1 to 100-m and the switch unit 300.

Each traffic shaper 100-i (i=1 to m) multiplexes variable-length packets input from the input line groups INi-1 to INi-n onto an input port PI-i of the switch unit 300 while controlling the bandwidth in accordance with a minimum guaranteed bandwidth and a maximum allowable bandwidth which are preliminarily designated for each connection. The values of the minimum guaranteed bandwidth and the maximum allowable bandwidth are set in each traffic shaper via signal lines S301-1 to S301-m from the controller 301.

Each packet distributor 310-i (i=1 to m) distributes output packets supplied from an output port PO-i of the switch unit 300 into signal lines Li-1 to Li-n corresponding to output lines OUT1i-1 to OUT1i-n in accordance with internal header information. Each packet transmission unit 320-i (i=1 to m) removes the internal header information which becomes unnecessary from the output packet supplied from the signal lines Li-1 to Li-n and transmits the output packet to output lines OUT1i-1 to OUTi-n.

Figure 2:
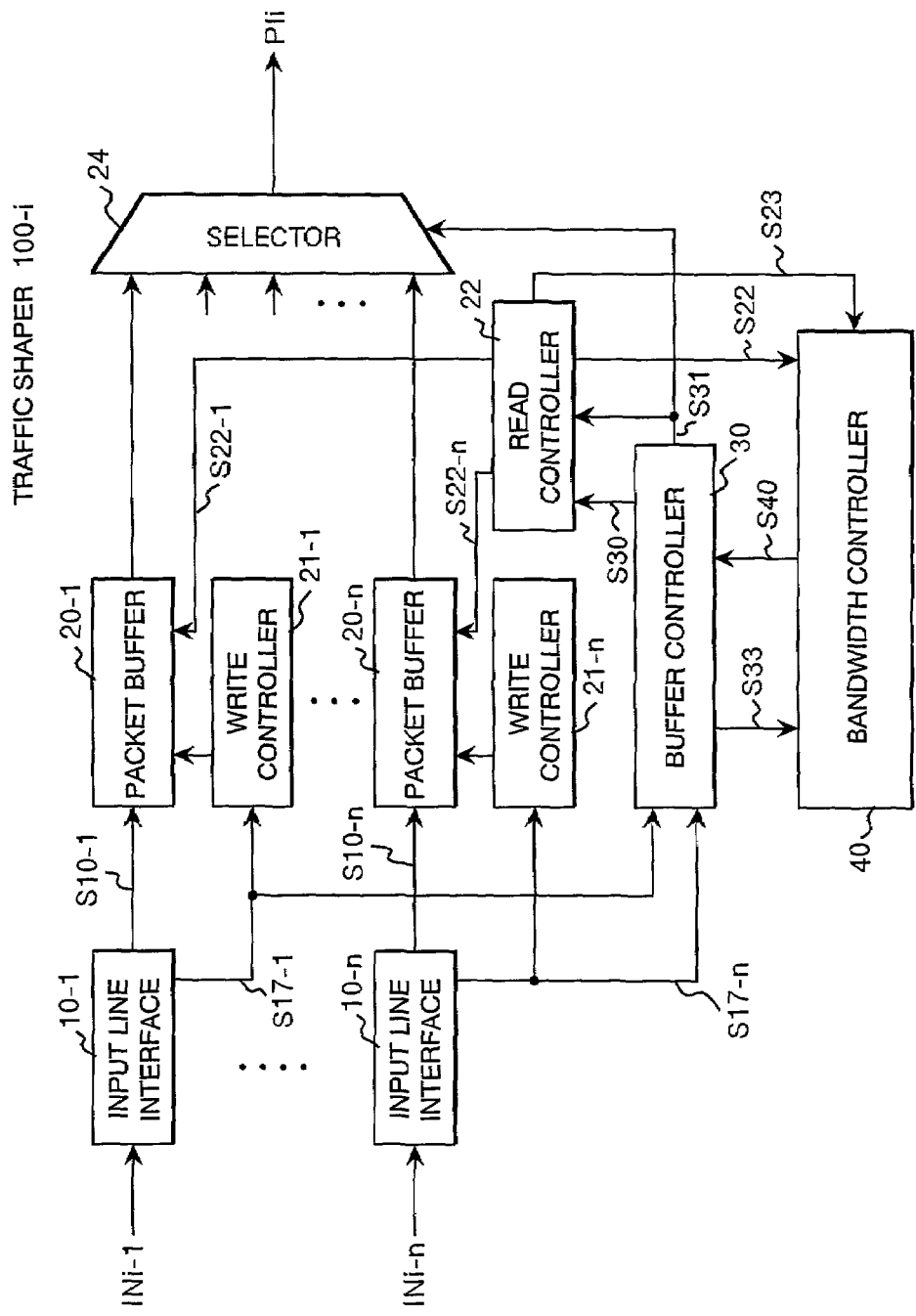
FIG. 2 is a diagram showing a first embodiment of the traffic shaper according to the invention.

FIG. 2 is a block diagram showing an example of the traffic shaper 100-i according to the invention.

The traffic shaper 100-i comprises a plurality of input line interfaces 10-j (j=1 to n) connected to the input lines INi-j a plurality of packet buffers 20-j (j=1 to n) connected to the input line interfaces 10-j via signal lines S10-j, a plurality of write controllers 21-j (j=1 to n) for writing packets to the packet buffers 20-j in accordance with a packet length L given from the input line interfaces 10-j via signal lines S17-j, a read controller 22 for controlling reading out of packets from the packet buffers 20-j (j=1 to n) via signal lines S22-j, a selector 24 for transferring output packets from the packet buffers 20-j (j=1 to n) to a port PIi, a buffer controller 30 and a bandwidth controller 40.

The buffer controller 30 stores the packet length L received from the input line interfaces 10-j (j=1 to n) via the signal lines S17-j and, in response to an output queue designation signal supplied from the bandwidth controller 40 via a signal line S40, outputs the packet length L and a buffer designation number "k" to signal lines S30 and S31.

The read controller 22 reads out data of one packet indicated by the packet length L from the packet buffer 20-k corresponding to the buffer designation number k. After completion of reading out of data of one packet, the read controller 22 outputs the buffer number k and the output packet length L to signal lines S22 and S23.

During the packet reading period, the selector 24 selects an output from the packet buffer 20-k designated by the buffer designation number k, and outputs it to the port PIi. The bandwidth controller 40 executes monitoring of the bandwidth by using a leaky bucket on the basis of the buffer number k and the packet length L received from the read controller 22 via the signal lines S22 and S23. With reference to output queue status information received from the buffer controller 30 via a signal line S33, the bandwidth controller 40 determines an output queue from which a packet is to be read out next, and outputs an output queue designation signal indicative of the number k of the output queue is output to the signal line S40.

Figure 3:
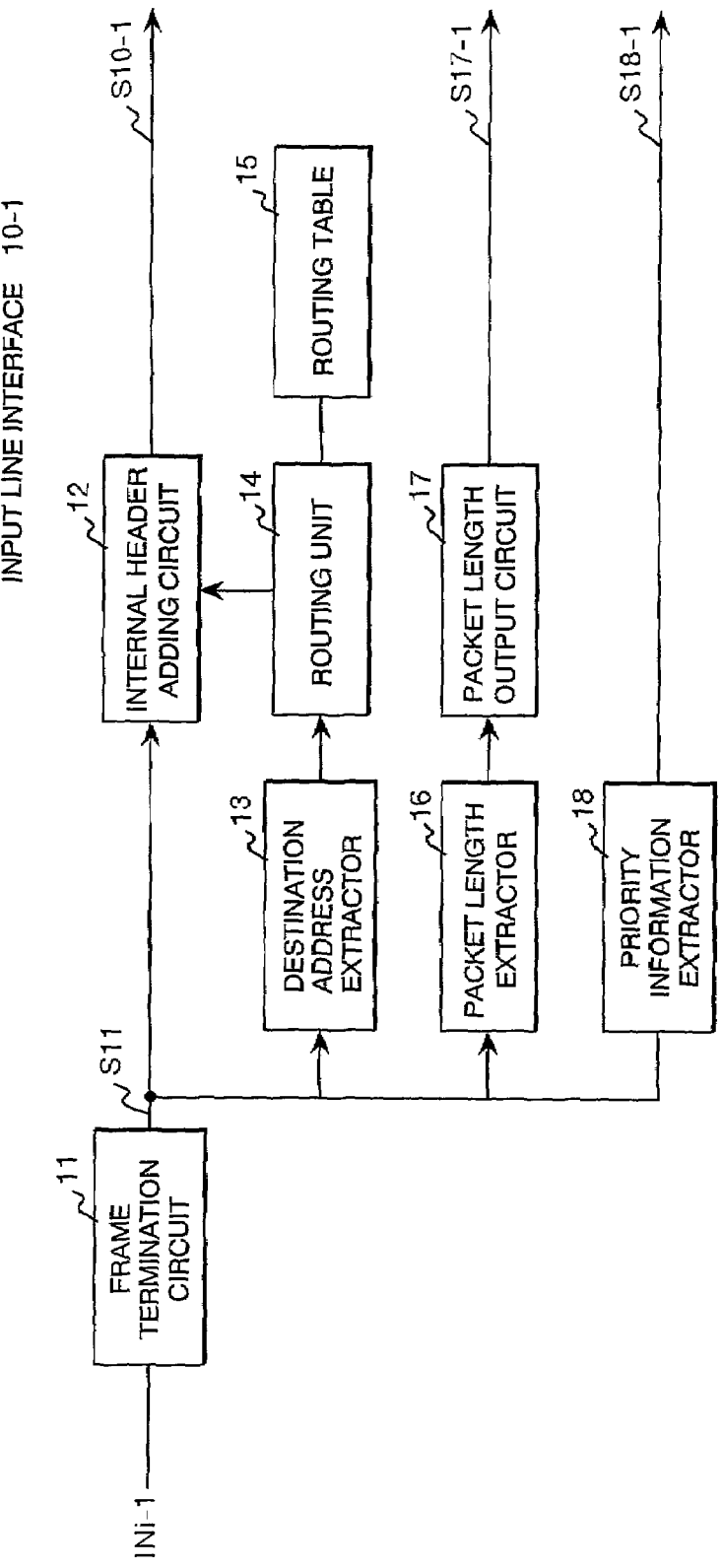
FIG. 3 is a diagram showing an example of an input line interface 10-1 illustrated in FIG. 2.

FIG. 3 shows an example of the input line interface.

The input line interface 10-1 includes a frame termination circuit 11 connected to the input line INi-1, an internal header adding circuit 12 for adding an internal header to a packet frame output from the frame termination circuit 11 to a signal line S11 and outputting the resultant to the signal line S10-1, a destination address extractor 13 for extracting a destination address from the header of the packet frame output to the signal line S11, a routing unit 14 for retrieving internal routing information from a routing table 15 in accordance with the destination address extracted by the destination address extractor 13, generating an internal header including the internal routing information, and supplying the generated internal header to the internal header adding circuit 12, a packet length extractor 16 for extracting a packet length from the header of the packet frame output to the signal line S11, and a packet length output circuit 17 for generating the packet length L obtained by adding the internal header length to the packet length extracted by the packet length extractor 16 and outputting the packet length L to the signal line S17-1. The packet length L shows the length of a packet to be read out from the packet buffer in bytes.

Figure 13:
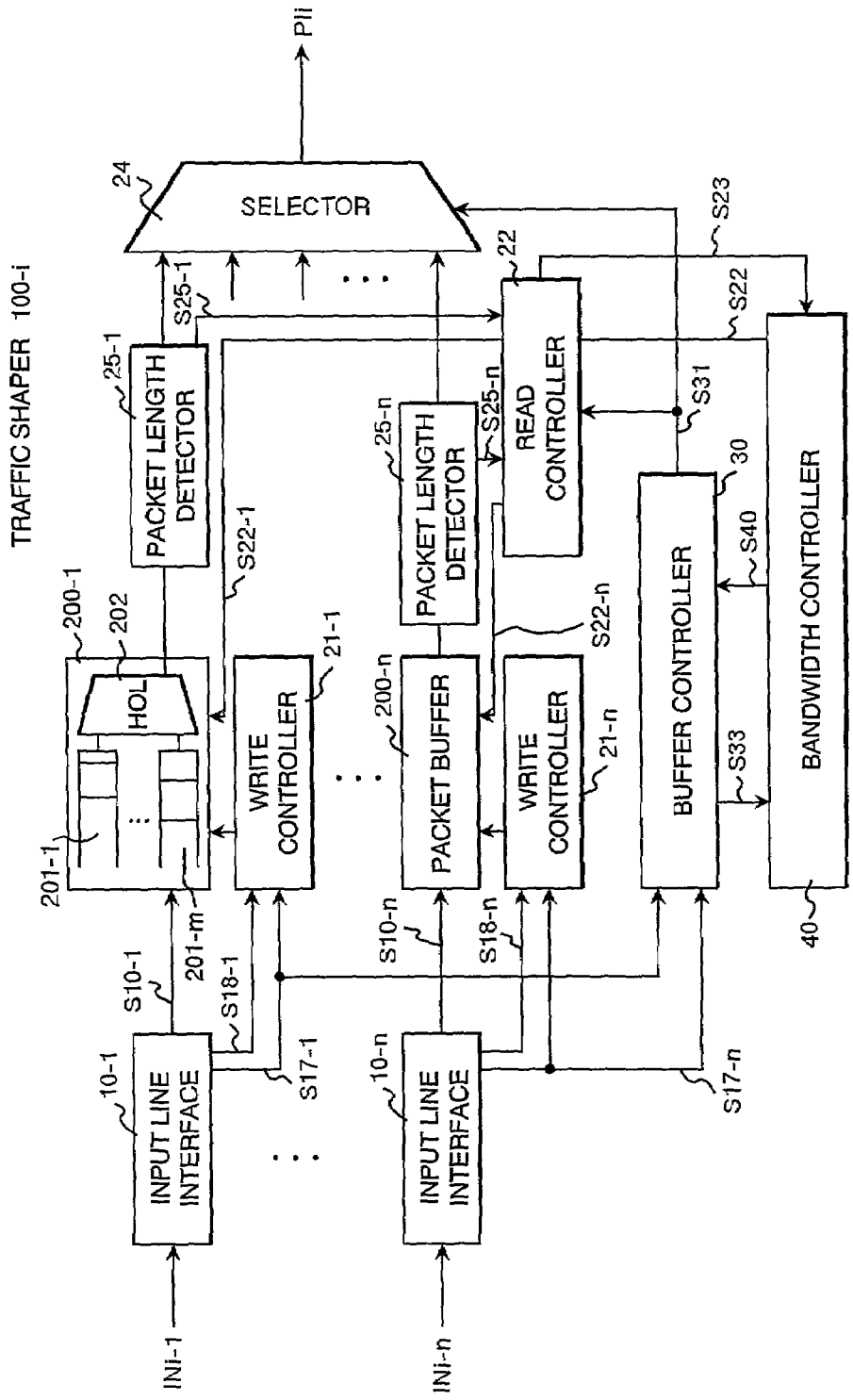
FIG. 13 is a diagram showing a second embodiment of the traffic shaper according to the invention.
Figure 14:
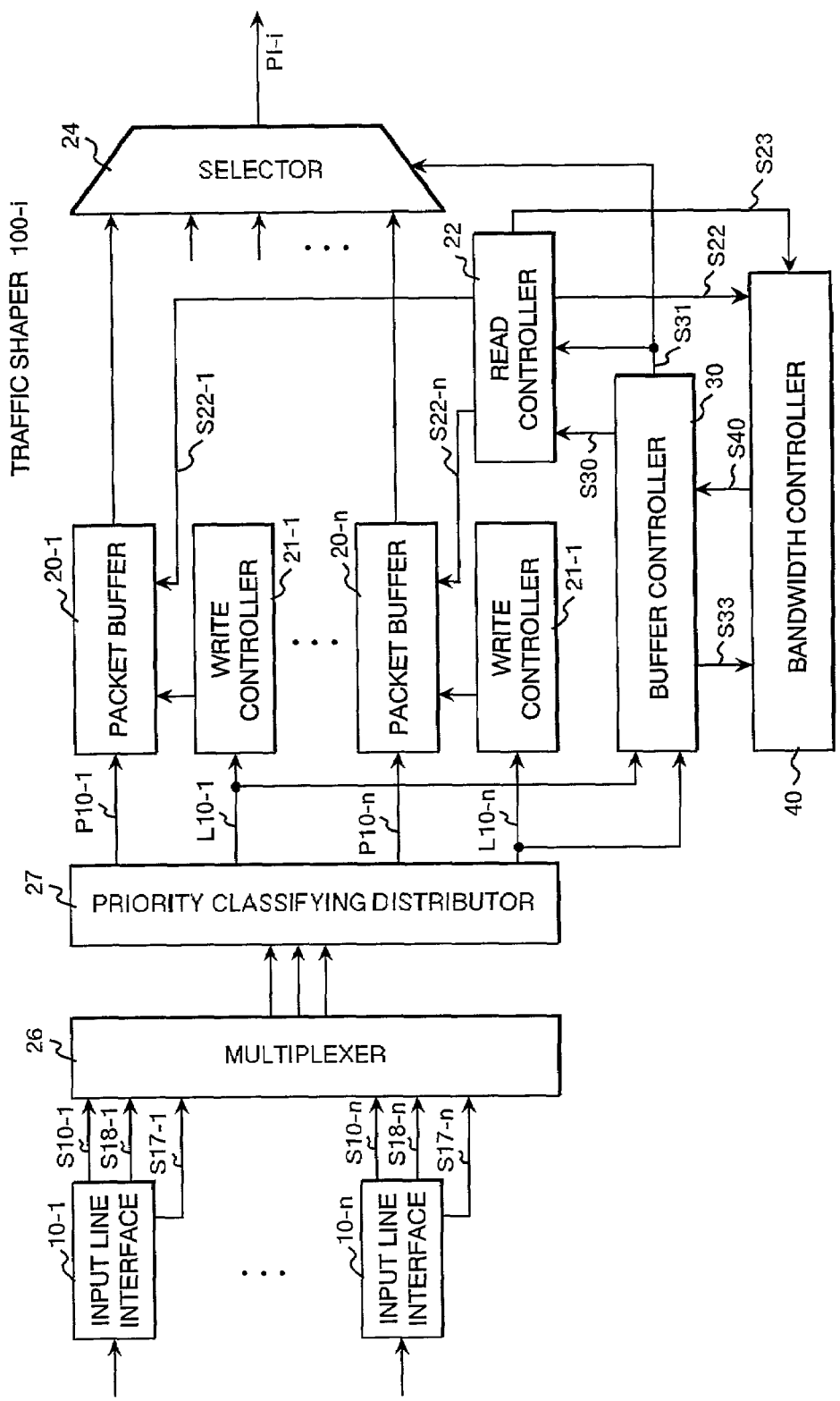
FIG. 14 is a diagram showing a third embodiment of the traffic shaper according to the invention.

Reference numeral 18 denotes a priority information extractor which becomes necessary in other embodiments of the invention to be described by referring to FIGS. 13 and 14 but is unnecessary for the input line interface 10-1 illustrated in FIG. 2. Each of the other input line interfaces 10-2 to 10-n has a configuration similar to that of the input line interface 10-1.

Figure 4:
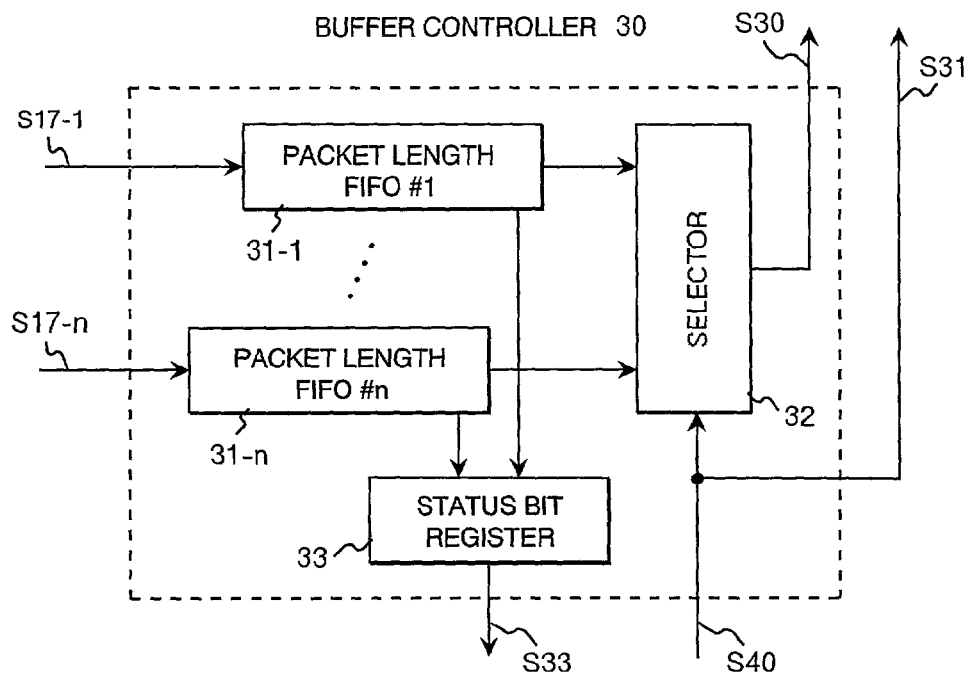
FIG. 4 is a diagram showing an example of a buffer controller 30 illustrated in FIG. 2.

FIG. 4 shows an example of the buffer controller 30.

The buffer controller 30 includes a plurality of packet length FIFOs 31-1 to 31-n for sequentially storing packet lengths L received from the signal lines S17-1 to S17-n, a selector 32 for reading out the first packet length L from the packet length FIFO 31-k specified by the out put queue designation signal output from the bandwidth controller 40 to the signal line S40 and outputting the packet length L to the signal line S30, and a status bit register 33 for generating a status bit pattern of n bits indicating whether or not valid data is stored in the packet length FIFO 31-i (i=1 to n).

The first bit of the status bit pattern output from the register 33 to the signal line S33 indicates the presence or absence of valid data in the packet length FIFO 31-1, that is, the presence or absence of packet data in the packet buffer 20-1, and the n-th bit indicates the presence or absence of packet data in the packet buffer 20-n. The output queue designation signal supplied from the signal line S40 is output as the buffer designation number k from the signal line S31.

Figure 5:
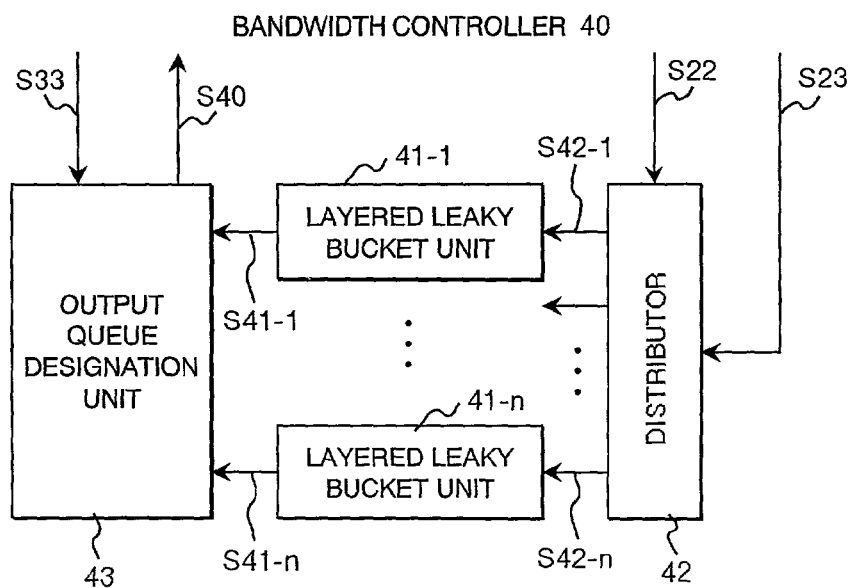
FIG. 5 is a diagram showing an example of a bandwidth controller 40 illustrated in FIG. 2.

FIG. 5 shows an example of the bandwidth controller 40.

The bandwidth controller 40 comprises a plurality of layered leaky bucket units 41-1 to 41-n prepared in correspondence with the packet buffers 20-1 to 20-n, a distributor 42 for inputting the packet length L output from the read controller 22 to the signal line S23 to the layered leaky bucket unit 41-k specified by the buffer designation number k notified via the signal line S22, and an output queue designation unit 43 connected to each of output lines of the layered leaky bucket units 41-1 to 41-n.

As will be described hereinafter, the output queue designation unit 43 determines an output queue from which a packet is to be read out next on the basis of a level value (counter value) of the leaky bucket output from the layered leaky bucket units 41-1 to 41-n to signal lines S41-1 to S41-n, the minimum guaranteed bandwidth and the maximum allowable bandwidth preliminarily designated for each packet buffer (20-1 to 20-n), and a status bit pattern output from the buffer controller 30 to the signal line S33. The output queue designation unit 43 outputs an output queue designation signal indicative of the number "k" assigned to the determined output queue to the signal line S40.

In order to make the features of the layered leaky bucket unit 41-i (i=1 to n) according to the invention easily understood, the problem of the conventional leaky bucket will be described with reference to FIGS. 6A to 6F.

Figure 6A:
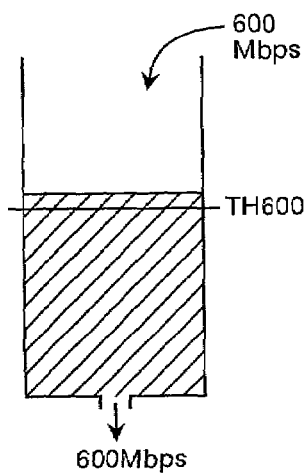
FIG. 6 is a diagram for explaining a problem of a conventional leaky bucket.

A case of guaranteeing the bandwidth of 600 Mbps at the minimum for a packet flow is now assumed. In this case, as shown in FIG. 6A, the packet flow is controlled by a leaky bucket having a threshold TH600 at a level corresponding to the minimum guaranteed bandwidth and having a leak rate of 600 Mbps.

Figure 6B:
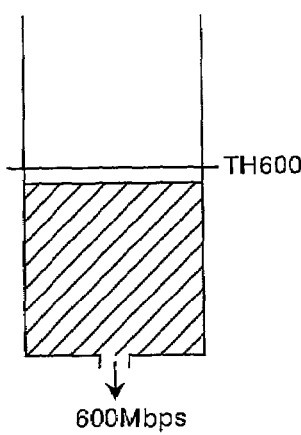
Figure 6C:
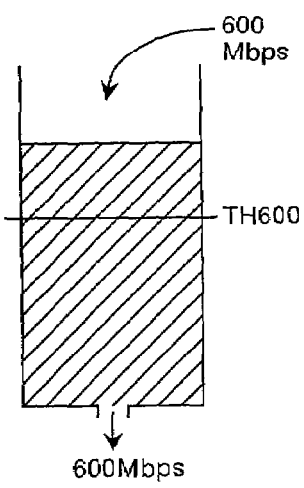

To the leaky bucket, each time a packet is read out from the packet buffer (output queue), "water" of a volume proportional to the packet length is poured. As long as the level exceeds the threshold TH600, reading out of a packet from the packet buffer is suppressed. As shown in FIG. 6B, when the water level drops below the threshold TH600, the transmission right of the next packet is granted. Therefore, while packets flow in at a rate almost equal to the minimum guaranteed bandwidth of 600 Mbps from the input line, as shown in FIGS. 6B and 6C, the level of the leaky bucket repeatedly increases and decreases around the threshold TH600 as the lower limit, and the input packets are transferred to the output line without causing excessive residence in the packet buffer.

Figure 6D:
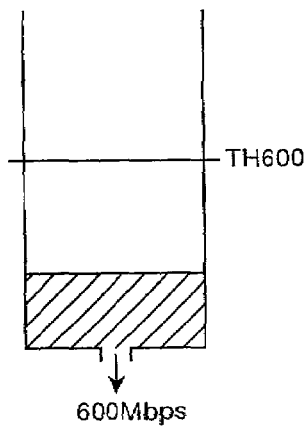
Figure 6E:
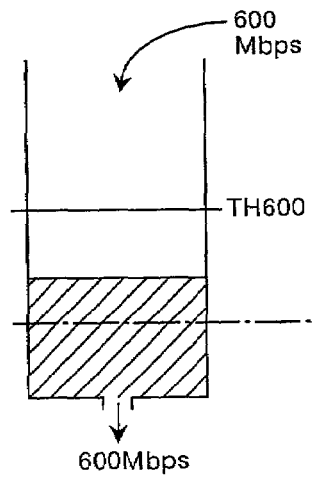
Figure 6F:
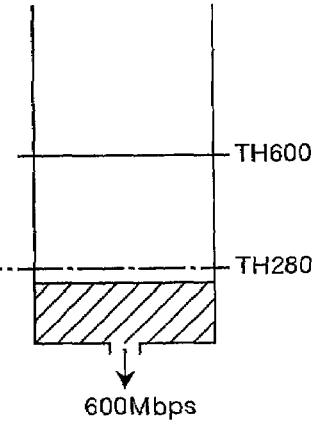

In the case where packets flow in at a rate over the minimum guaranteed bandwidth of 600 Mbps from the input line, if the packets flow output from the packet buffer is controlled to 600 Mbps, the amount of packets residual in the packet queue increases. On the contrary, if the amount of packets flowing from the input line largely decreases, the level of the leaky bucket drops as shown in FIG. 6D. In this state, if packets flow in at a rate almost equal to the minimum guaranteed bandwidth of 600 Mbps, as shown in FIGS. 6E and 6F, the leaky bucket level increases and decreases around a level of TH280 as a lower limit, which is lower than the threshold TH600.

In the bandwidth control using the leaky bucket, the packet transmission right is granted when the level becomes equal to or below the threshold. Therefore, as shown in FIGS. 6D to 6F, when the level largely drops below the threshold TH600, as long as stored packets exist, the transmission right is frequently granted to the packet buffer corresponding to the leaky bucket.

In the case where the level drops largely below the threshold and, after that, packets flow in at a rate over the minimum guaranteed bandwidth of 600 Mbps, during a period until the level reaches the threshold TH600, packets are transmitted to the output line at a rate over the minimum guaranteed bandwidth. That is, unfairness occurs such that packets are transmitted in the minimum guaranteed bandwidth from the packet buffer of which leaky bucket level increases and decreases around the threshold level, and packets are continuously transmitted at a rate over the minimum guaranteed bandwidth from the packet buffer of which leaky bucket level is largely below the threshold for a considerable period of time.

The feature of the invention resides in that the level increase amount associated with packet transfer is changed according to the current level of the leaky bucket. Specifically, the invention is characterized in that, by varying a unitary increment value applied to calculation of a level increase amount according to the current water level, even when the same size packets are transmitted, the amount of water poured into the leaky bucket is varied depending on the current level.

According to the invention, for example, when the level largely drops as shown in FIG. 6D, by increasing the unitary increment value, the amount of raising the leaky bucket associated with the packet transmission is increased so that the leaky bucket level is rapidly made close to the threshold.

In order to provide packet transfer service in a bandwidth over the minimum guaranteed bandwidth by using an unoccupied bandwidth or a surplus bandwidth in the communication line, the transmission right has to be granted to a buffer of which leaky bucket level is over the threshold TH600 indicative of the minimum guaranteed bandwidth. According to the invention, in the case of granting the packet transmission right over the minimum guaranteed bandwidth, the amount of level raised is reduced by decreasing the unitary increment value applied to the calculation of the increased level.

Figure 7:
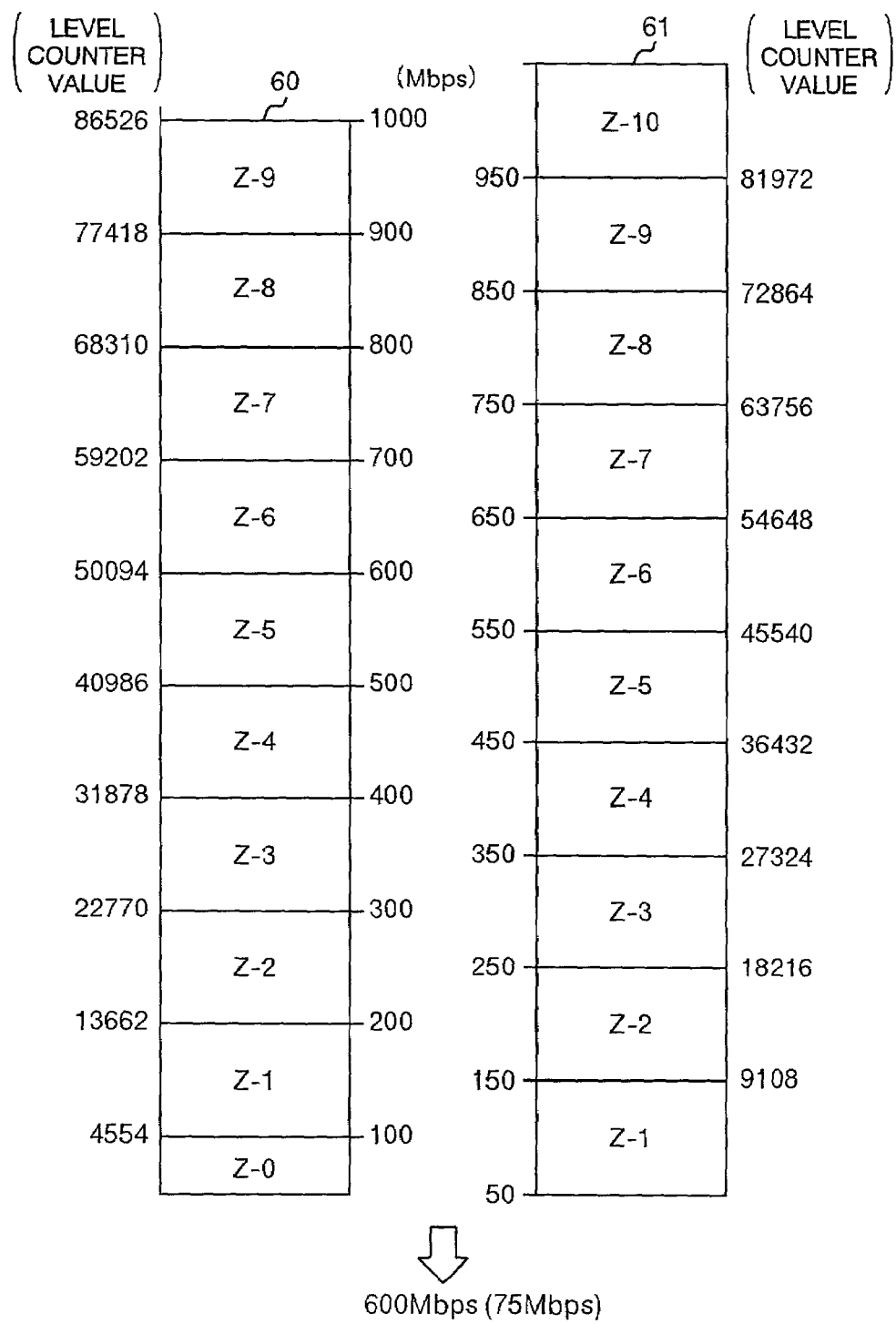
FIG. 7 is a diagram for explaining the relation between a leaky bucket level in a layered leaky bucket and a unitary increment for calculating an increased level.

FIG. 7 is a diagram for explaining the relation between the leaky bucket level in the layered leaky bucket 41 of the invention and the unitary increment applied to the increased level calculation.

In the embodiment, the leaky bucket is divided into a plurality of level zones in the depth direction, and different unitary increment values are assigned to the level zones. When the level changes from one level zone to another level zone, the value of the unitary increment value applied to the level increase calculation is switched step by step.

In tables 60 and 61, Z-0 to Z-10 denotes level zones obtained by dividing the leaky bucket at equal intervals in the depth direction, respectively. As long as the level changes in the same level zone, the same unitary increment value is applied to calculate the value of the increased level.

The table 60 is a first level zone definition table divided into level zones Z-1 to Z-10 with boundaries at 100 Mbps, 200 Mbps, . . . 1000 Mbps. The table 61 is a second level zone definition table divided into level zones Z-1 to Z-10 with boundaries at 50 Mbps, 150 Mbps, 250 Mbps, . . . 1050 Mbps.

Level counter values "86526" to "4554" on the left side of the first table 60 indicate the count values of the level counter corresponding to the bandwidth values 1000 Mbps to 100 Mbps. Level counter values "81972" to "9108" on the right side of the second table 61 indicate count values of the level counter corresponding to the bandwidth values 950 Mbps to 150 Mbps. The unitary increment value assigned to each level zone decreases as the level becomes higher.

The invention is characterized in that, when a packet is transmitted, a variable unitary increment value is applied to raise the level of the leaky bucket close to the threshold, and a packet buffer from which a packet is to be transmitted is selected from packet buffers each having a level equal to or lower than the threshold. For each leaky bucket, a first threshold corresponding to the minimum guaranteed bandwidth and a second threshold corresponding to the maximum allowable bandwidth are set. In these two thresholds, the first threshold corresponding to the minimum guaranteed bandwidth is important for the bandwidth control. The packet transmission right is granted to a packet buffer of which leaky bucket level drops below the first threshold, or a packet buffer of which leaky bucket level is the closest to the first threshold.

The reason why the first and second level zone definition tables 60 and 61 with different scales of the level zones are prepared is to avoid such a situation that different unitary increment values are applied depending on whether the current leaky bucket level is over the minimum guaranteed bandwidth or not when the packet transmission right is granted to one packet buffer.

For example, assuming such a case where a zone corresponding to the current leaky bucket level is determined by using the first level zone definition table 60 as to packets traffic having the minimum guaranteed bandwidth (first threshold) at 600 Mbps, if the current leaky bucket level is lower than the count value "50094" even slightly, the unitary increment in the level zone Z-5 is applied. On the other hand, if the current leaky bucket level is higher than the count value "50094" even slightly, the unitary increment in the level zone Z-6 is applied. Therefore, even when the same size packet is transmitted, a difference occurs in the results of increased level calculations, and it exerts an influence on waiting time until the next packet transmission right is granted.

When the second level zone definition table 61 having the threshold of 600 Mbs in the center of the level zone Z-6 is applied to the traffic, even if the current leaky packet level fluctuates slightly around the threshold, the same unitary increment is applied. Consequently, stable minimum guaranteed bandwidth control can be performed.

In the case where the leak amount of the leaky bucket is 600 Mbps, the unitary increment value used for the level zone Z-6 may be set as "1". By using the value as a reference, the unitary increment ($\alpha$) value to be assigned to each of the other level zones Z-1 to Z-5 and Z-7 to Z-10 is determined.

FIGS. 8A and 8B show an example of first and second unitary increment ($\alpha$) value tables 411 and 412, respectively, used in the embodiment of the invention.

In the tables, according to the level zone definitions (Z-1 to Z-10) shown by the first and second level zone definition tables 60 and 61 illustrated in FIG. 7, the ranges of the level counter values and the unitary increment ($\alpha$) values are registered. In each level zone, the $\alpha$ value inversely proportional to the zone number is set by using the value "1" of the level zone Z-6 as a reference.

Figure 9:
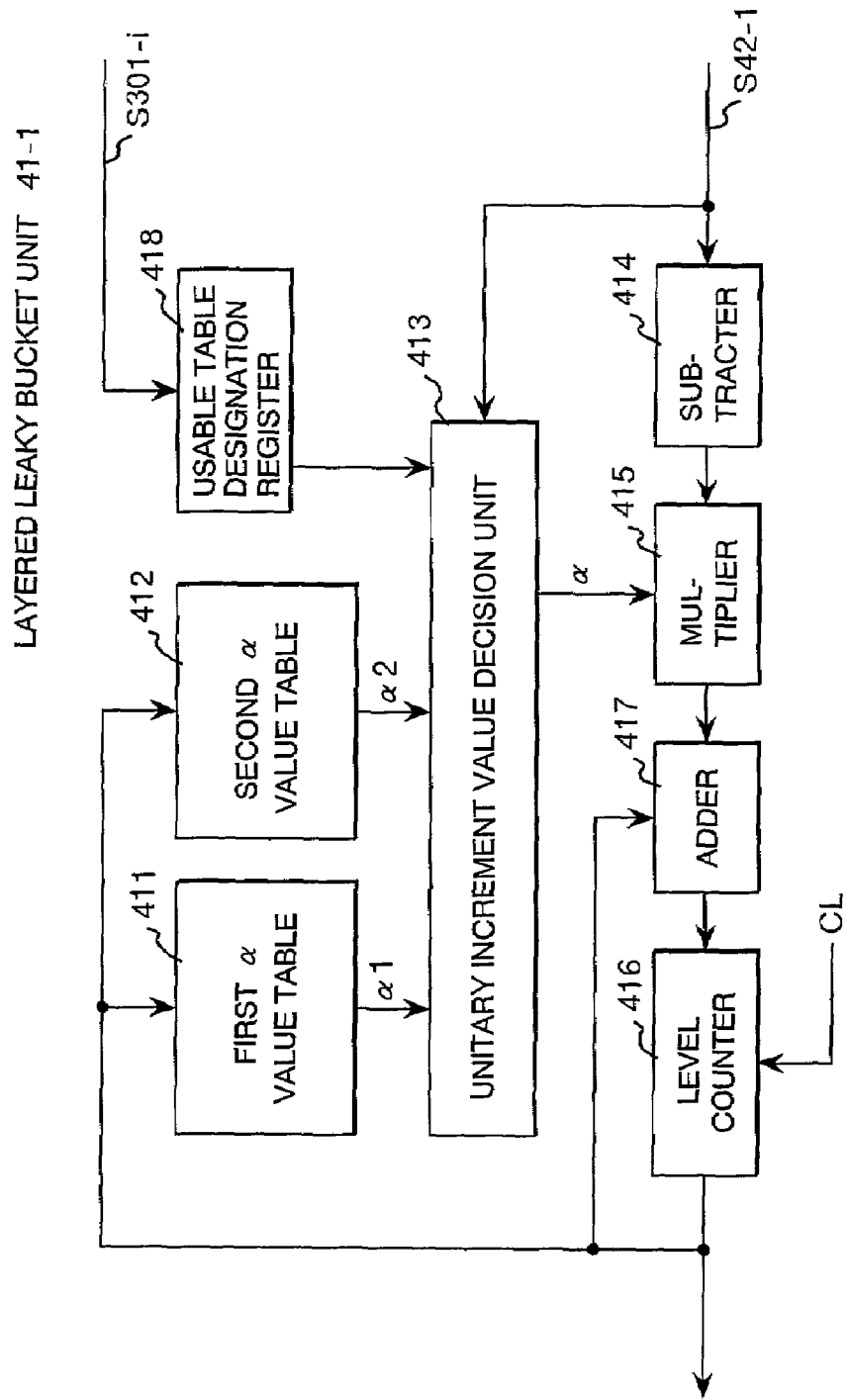
FIG. 9 is a diagram showing an example of a layered leaky bucket 41-1 illustrated in FIG. 5.

FIG. 9 shows an example of the layered leaky bucket unit 41-1 illustrated in FIG. 5.

The layered leaky bucket unit 41-1 includes the first and second $\alpha$ value tables 411 and 412 illustrated in FIG. 8, a unitary increment value decision unit 413 connected to the tables 411 and 412; a subtracter 414 for subtracting an internal packet header length from the packet length L input from a signal line S42-1 and outputting a true packet length L0 of an input packet, a multiplier 415 for multiplying the $\alpha$ value given from the decision unit 413 with the packet length L0 output from the subtracter 414, a level counter 416 for decrementing the counter value synchronously with a clock CL; an adder 417 for adding an output value of the multiplier 415 and an output value of the level counter 416 and setting the resultant into the level counter, and a usable table designation register 418. In the register 418, usable table designation information is set from the controller 301 illustrated in FIG. 1 via the signal line S301-i.

From the first and second $\alpha$ value tables 411 and 412, increment values $\alpha1$ and $\alpha2$ corresponding to the current level of the leaky bucket indicated by the output of the level counter 416 are read out. The unitary increment value decision unit 413 captures the output value $\alpha1$ or $\alpha2$ of the $\alpha$ value table designated by the usable table designation register 418 at a timing when the packet length L is output to the signal line S42-1 and supplies it as a unitary increment value $\alpha$ for the increased level calculation to the multiplier 415.

From the multiplier 415, a result of multiplication of the unitary increment value $\alpha$ and the packet length L0, that is, the value indicative of the increased level of the leaky bucket is output. The adder 417 adds the increased level output from the multiplier 415 to the counter value indicating the current level of the leaky bucket output from the level counter 416, and sets the resultant to the level counter 416.

In the embodiment, the layered leaky bucket 41-1 selectively uses the output values of the first and second $\alpha$ value tables 411 and 412 to count the increased level in accordance with the usable table designation information. It is also possible to selectively use $\alpha$ value tables of three or more kinds. Also in the case where the minimum guaranteed bandwidth is an odd value such as 70 Mbps or 680 Mbps, an α value table having a threshold indicative of the minimum guaranteed bandwidth as an almost center of the level zone can be selected. It is also possible to prepare one α value table for each layered leaky bucket unit and to update the data in the α value table in accordance with the value of the designated minimum guaranteed bandwidth.

Figure 10:
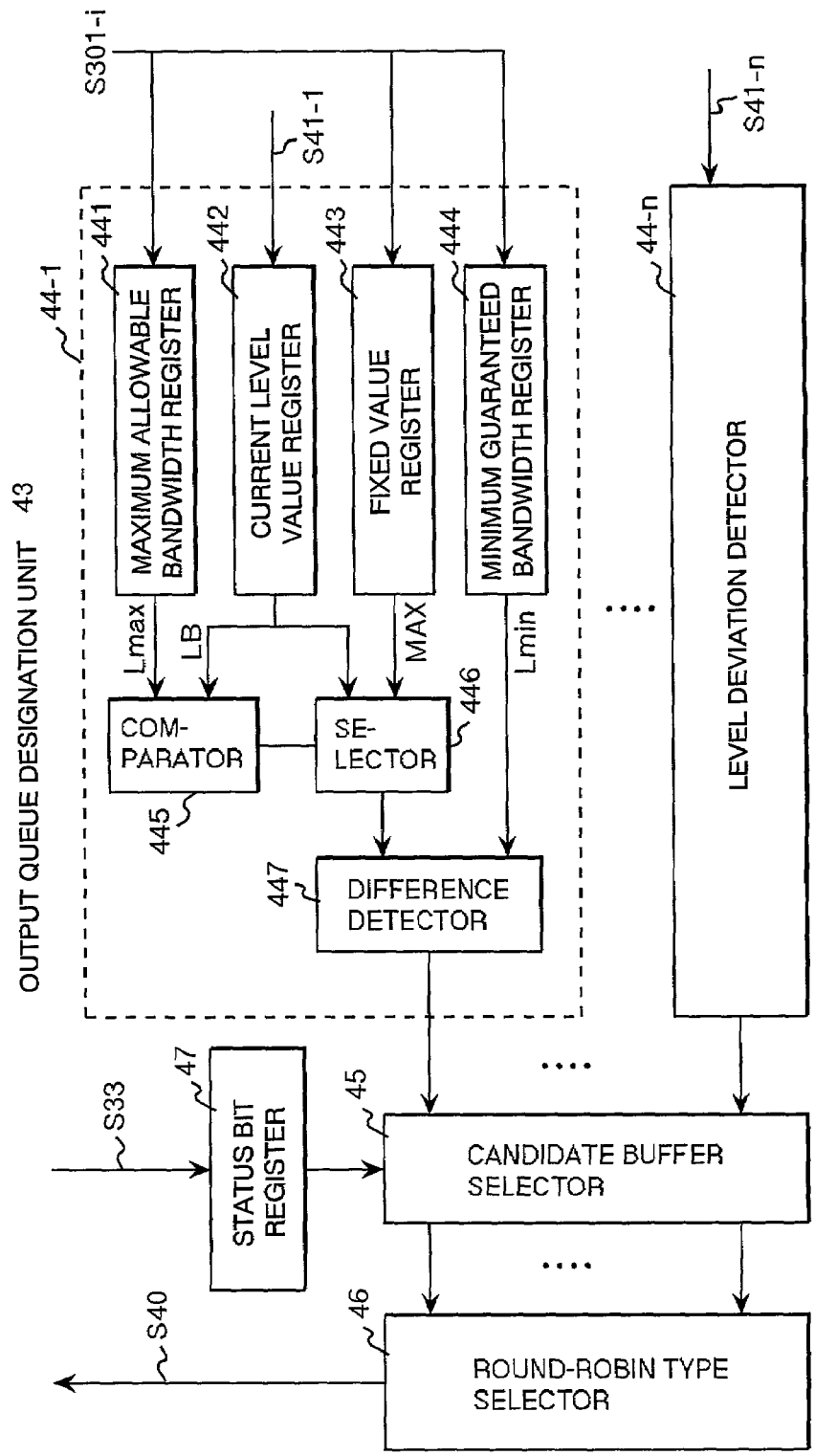
FIG. 10 is a diagram showing an example of an output queue designation unit 43 illustrated in FIG. 5.

FIG. 10 shows an example of the output queue designation unit 43 illustrated in FIG. 5.

The output queue designation unit 43 comprises a plurality of level deviation detectors 44-1 to 44-n connected to the layered leaky bucket units 41-1 to 41-n, respectively, a candidate buffer selector 45 for selecting one or a plurality of packet buffer numbers as candidates of packet output buffers on the basis of output values of the level deviation detectors, a round-robin type selector 46 for selecting one buffer number "k" in the round-robin manner from the candidate buffer numbers output from the candidate buffer selector 45 and outputting it as an output queue designation signal to the signal line S40, and a status bit register 47 for storing a status bit pattern supplied from the buffer controller 30 via the signal line S33.

The first level deviation detector 44-1 corresponds to the first packet buffer 20-1 shown in FIG. 2, and the i-th level deviation detector 44-i corresponds to the packet buffer 20-i. The level deviation detector 44-1 has a maximum allowable bandwidth register 441, a current level value register 442 for holding a current level value (output value of the level counter 416) LB of the leaky bucket supplied via the signal line S41-1, a fixed value register 443, and a minimum guaranteed bandwidth register 444.

In the maximum allowable bandwidth register 444, the value of the maximum allowable bandwidth for the packets stored in the packet buffer 20-1 is set as a value Lmax obtained by converting the value of the maximum allowable bandwidth into a level counter value shown in FIG. 7. Similarly, in the register 444, a level value Lmin indicative of the minimum guaranteed bandwidth to be guaranteed to the packets stored in the packet buffer 20-1 is set. These values are supplied from the controller 301 illustrated in FIG. 1 via the signal line S301-i. In the register 443, the maximum count value MAX in the leaky bucket is set as a fixed value.

The level deviation detector 44-1 compares the value Lmax of the register 441 and the value LB of the register 442 by a comparator 445. If LB is larger than Lmax, the value MAX of the register 443 is selected by a selector 446 and supplied to a difference detector 447. If LB is smaller than Lmax, the value LB of the register 442 is selected. The difference detector 447 outputs a difference value obtained by subtracting the minimum guaranteed bandwidth value Lmin indicated by the register 444 from the output value LB or MAX of the selector 446. When the value obtained by subtracting Lmin from LB becomes negative, the difference detector 447 outputs zero.

The candidate buffer selector 45 invalidates difference values corresponding to the bit position of "0" bit in the status bit register 47, that is, difference values corresponding to packet buffer storing no packet to be transmitted, out of the difference values output from the level deviation detectors 44-1 to 44-n, and selects the minimum value from the remaining difference values.

As described above, when the current level LB of the leaky bucket is lower than the value Lmin of the minimum guaranteed bandwidth (LB−Lmin<0), each level deviation detector 44 outputs "0" as a difference value. Consequently, there is the possibility that difference values having the minimum value "0" are simultaneously input from the plurality of level deviation detectors to the candidate buffer selector 45.

The candidate buffer selector 45 outputs a bit pattern indicative of a selection result in the form that "1" is set to a bit corresponding to the level deviation detector outputting the minimum value and "0" is set to the other bit positions in a bit pattern of n bits in which the i-th bit corresponds to the i-th level deviation detector 44-i to the round-robin selector 46.

To fairly grant the transmission right to the packet buffers 20 storing packets to be sent, the round-robin selector 46 selects the bit position "k" of the bit "1" in the round-robin fashion in which the packet buffer to which the transmission right has been granted last time is selected last among the candidate 34 buffers indicated by the bit "1" in the bit pattern output from the selector 45, and outputs the buffer number "k" as an output buffer instruction signal. The operation is executed each time a packet is transmitted from the traffic shaper at a timing of responding to an output of the packet length L from the read controller 22 to the signal line S23.

The function of the traffic shaper of the invention will be described by referring a simple use model shown in FIG. 11.

Figure 11:
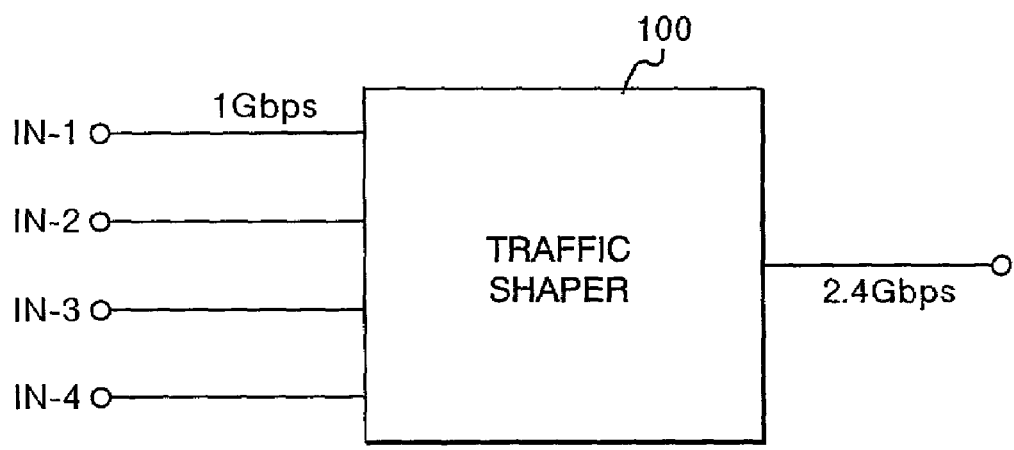
FIG. 11 is a diagram showing an example of a model of a traffic shaper.

The traffic shaper 100 shown in FIG. 11 has four input lines IN-1 to IN-4 each allowing traffic up to 1 Gbps like the gigabit Ethernet, multiplies the traffic entered from the input lines onto an output line having the bandwidth of 2.4 Gbps while guaranteeing the minimum guaranteed bandwidth of each input line, and outputs the traffic.

To simplify the explanation, it is assumed here that each of the input lines is used by one user respectively, and the bandwidth of 2.4 Gbps of the output line is fairly shared by the traffic in the input lines IN-1 to IN-4. 600 Mbps (75 Mbytes) of an average bandwidth per traffic is set as a basic bandwidth and is used as a leak rate of the leaky bucket. 600 Mbps means that the count value of the level counter 416 in each layered leaky bucket decreases at 75 MHz with elapse of time.

It is also assumed that the unitary increment value per byte used in the level zone corresponding to the basic bandwidth 600 Mbps is "1" and is switched in the level zones of the leaky bucket in accordance with the first and second α value tables 411 and 412 shown in FIG. 7.

Although the minimum guaranteed bandwidth assigned to each user is freely selected within the range of the bandwidth of each input line (0 Mbps to 1000 Mbps), the total bandwidth of all the users cannot exceed the bandwidth 2.4 Gbps of the output line. The maximum allowable bandwidth can be freely assigned to the user within the range of the bandwidth of each input line, but the maximum allowable bandwidth equal to or lower than the minimum guaranteed bandwidth cannot be set to the same user.

Since the maximum allowable bandwidth indicates the upper limit value of the bandwidth which each user can use in the case where an unoccupied bandwidth occurs in the output line, the total value of the maximum allowable bandwidths of all the users may exceed the bandwidth (2.4 Gbps) of the output line. When the user does not designate the maximum allowable bandwidth, it is sufficient to set, as a default value, for example, the bandwidth value of the input line.

It is assumed that 800 Mbps, 350 Mbps, 400 Mbps, and 800 Mbps are assigned to traffic of the input lines IN-1 to IN-4, respectively, as values of the minimum guaranteed bandwidths expressed by Lmin and, as values of the maximum allowable bandwidths expressed by Lmax, 900 Mbps, 600 Mbps, 800 Mbps, and 1000 Mbps are assigned to the input lines IN-1 to IN-4, respectively.

The statuses of leaky buckets 600-1 to 600-4 corresponding to the input lines IN-1 to IN-4 in this case, respectively, are as shown in FIGS. 12A to 12D. The level zones Z-1 to Z-10 of the leaky bucket 600-2 are defined according to the first level zone definition table 60 shown in FIG. 7, and the unitary increment value is determined by the first α value table 411. The level zones Z-1 to Z10 of each of the other leaky buckets 600-1, 600-3, and 600-4 are defined according to the second level zone definition table 61, and the unitary increment value is determined by the second α value table 412.

In the initial state, the level of each leaky bucket is at the level of the minimum guaranteed bandwidth Lmin as shown by hatching. Although the level of the leaky bucket decreases at the leak rate of 600 Mbps, as long as packets flow in from each input line in the minimum guaranteed bandwidth, increase in the level by the incoming packets and decrease in the level due to a leak are balanced, so that the minimum level is kept at the level Lmin.

For example, the leaky buckets 600-3 and 600-4 are compared with each other. The minimum level (threshold Lmin) of the leaky bucket 600-4 is twice as high as that of the leaky bucket 600-3, and the value of the unitary increment α applied to calculation of the increased level of the leaky bucket 600-3 and that of the leaky bucket 600-4 have the relation of 1:2.

When packets having the same length are output, therefore, the increased level of the leaky bucket 600-3 from the level Lmin is twice as large as that of the leaky bucket 600-4. Since the leak rates from the leaky buckets are the same, time required for the leaky bucket 600-3 to decrease its level to Lmin is twice as long as that required for the leaky bucket 600-4. As a result, the transmission rate of packets is proportional to the minimum guaranteed bandwidth of each bandwidth.

As described above, the invention employs the layered leaky buckets whose unitary increment value applied to the calculation of an increased level changes according to the current level. Therefore, even in the case where the packet flow is temporarily stopped and the level remarkably drops from the level Lmin of the minimum guaranteed bandwidth, when the next packet is transmitted, the level is largely raised by using the unitary increment of a large value, thereby enabling the level to be rapidly returned to the position of the threshold Lmin. The proper bandwidth control for guaranteeing the minimum guaranteed bandwidth can be performed on the subsequent packet flow.

In the invention, by the output queue designation unit 43 shown in FIG. 10, the packet transmission right is granted to a packet buffer whose difference value between the current level and the minimum guaranteed bandwidth Lmin becomes the minimum out of the plurality of packet buffers having packets to be transmitted. If the level of the corresponding leaky bucket drops below the minimum guaranteed bandwidth Lmin, the difference value between the current level and the level Lmin of the minimum guaranteed bandwidth is set to zero. Further, when a plurality of candidates for the output buffers are detected, the transmission right are granted fairly to the packet buffers in the round-robin manner.

By the output queue designation unit 43, when the current level is higher than the level Lmin of the minimum guaranteed bandwidth in all of the leaky buckets corresponding to the packet buffers storing packets, the packet transmission right is granted to the packet buffer whose current level is closest to the threshold level Lmin.

According to the invention, therefore, by using an unoccupied bandwidth in the output line, the bandwidth control over the minimum guaranteed bandwidth can be also performed. Transmission of packets at a rate over the minimum guaranteed bandwidth is performed within the preset maximum allowable bandwidth (level Mmax). In this case, as obviously understood from the explanation of the operations of the leaky buckets 600-3 and 600-4 of FIG. 12, the packet transmission right is granted to the traffic in proportional to the minimum guaranteed bandwidth. In the invention, therefore, the unoccupied bandwidth in the output line is fairly shared in proportional to the minimum guaranteed bandwidths of the traffic multiplexed on the output line.

FIG. 13 shows a second embodiment of the traffic shaper 100-i according to the invention. The traffic shaper 100-i shown here is of a perfect priority control type in which input packets are buffered by the priority for each of the input lines INi-j (j=1 to m, j=1 to n) and the packets are transmitted in accordance with the priority order from the high priority to the low priority.

In the embodiment, the input line interface 10-i (i=1 to n) of a structure having the priority information extractor 18-i shown in FIG. 3 is used. The priority information extractor 18-i extracts the priority information, for example, a service type from the header of an input packet and outputs it as a priority class identifier to a signal line S18-i.

In the embodiment, in place of the packet buffers 20-i shown in FIG. 2, packet buffer units 200-i each having a plurality of buffers 201-1 to 201-m prepared for different priority classes and a priority buffer selector 202 are used. A packet length detector 25-i is provided for an output line of each packet buffer unit 200-i.

Each write controller 21-i receives a packet length L and a priority class identifier "p" from a corresponding input line interface 10-i via signal lines S17-i and S18-i and writes an input packet output to the signal line S10-i to the buffer 201-p specified by the priority class identifier "p".

In the case of the embodiment, packets are read out from each packet buffer unit 200-i in accordance with the order of the priority class, the input order and the output order of packets in the packet buffer unit 200-i are different from each other. Consequently, in the case of performing a control of reading outpackets by using the packet length supplied from the input line interface 10-i to the buffer controller 30, the packet lengths have to be held by priority class in the buffer controller 30, so that the configuration becomes complicated.

In the embodiment, therefore, the read controller 22 supplies a packet data read control signal to the packet buffer 200-k in accordance with the buffer designation signal "k" supplied from the buffer controller 30, and the length L of the read packet is detected by the packet length detector 25-k. The read controller 22 supplies data read control signals of one packet to the packet buffer unit 200-k in accordance with the packet length L given from the packet length detector 25-i via the signal line S25-k.

The priority buffer selector 202 in the packet buffer unit 200-k operates to read out a packet from the buffer having the highest priority when packet transmission right is granted. Specifically, a buffer is selected by the perfect priority control manner in which as long as packets are stored in the buffer 201-1 of the highest priority class, packets are read out from the buffer 201-1, and when there is no packet in the highest priority class, packets are read out from the buffer 201-2 of the second highest priority class.

When the packet data read control signal is output to the signal line S22-k, packets having the highest priority are read out from the packet buffer unit 200-k. After completion of the reading of data of one packet from the packet buffer unit 200-k, the read controller 22 outputs the buffer number "k" to the signal line S22, and outputs the packet length L received from the packet length detector 25-k to the signal line S23.

The bandwidth controller 40 performs a packet transmitting control according to each minimum guaranteed bandwidth within the range of the maximum allowable bandwidth preset for each packet buffer unit 200-i (i=1 to n) in a manner similar to the first embodiment.

FIG. 14 shows further another embodiment of the traffic shaper according to the invention.

In the embodiment, the minimum guaranteed bandwidth and the maximum allowable bandwidth are designated for each priority glass, and the packet buffers 20-1 to 20-n shown in FIG. 2 are used as buffers of different priority classes.

A packet, a packet length, and a priority class identifier output from each input line interface 10-i (i=1 to n) to signal lines S10-i, S17-i, and S18-i are supplied to a priority classifying distributor 27 via a multiplexer 26. The priority classing distributor 27 supplies the packet received from the multiplexer 26 to the packet buffer 20-p indicated by the priority class identifier "p", and supplies the packet length to the write controller 21-p indicated by the priority class identifier "p".

The operation of writing a packet to the packet buffer 20-p by the write controller 21-p is performed in a manner similar to the first-embodiment shown in FIG. 2. In such a manner, packets having the same priority class "p" input from the plurality of input lines are sequentially stored in the packet buffer 20-p.

Within the maximum allowable bandwidth preset for each of priority classes, the bandwidth controller 40 executes a control of transmitting packets according to the corresponding minimum guaranteed bandwidth. In this case, the layered leaky buckets 41-1 to 41-n shown in FIG. 5 calculate the leaky bucket levels corresponding to the packet transmissions from the packet buffers 20-1 to 20-n in a manner similar to the first embodiment.

The output queue designation unit 43 selects candidate buffers in a manner similar to the first embodiment by using, as thresholds, the minimum guaranteed bandwidths set for the priority classes in the level deviation detectors 44-1 to 44-n, and generates an output buffer instruction signal to the signal line S40.

The embodiment can be also applied to bandwidth control of an MCR (Maximum Cell Rate) or PCR (Peak Cell Rate) in a virtual channel of the ATM (Asynchronous Transfer Mode).

Figure 15:
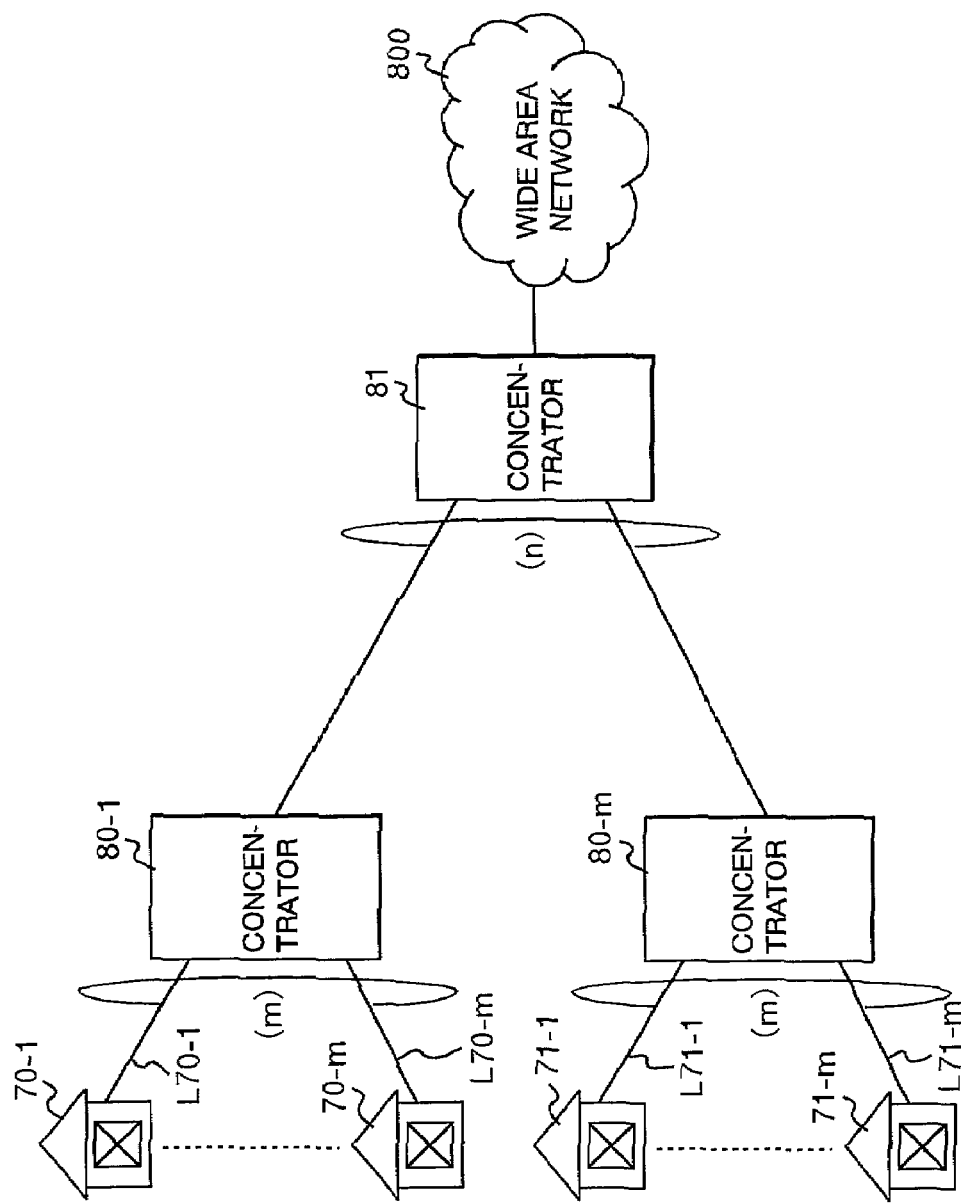
FIG. 15 is a diagram showing an application of the traffic shaper according to the invention.

The traffic shaper according to the invention can be also applied to a concentrator for the FTTH (Fiber To The Home) as shown in FIG. 15.

At present, broadband service using optical fibers is being provided to subscriber homes. The current FTTH service is provided in the best effort fashion in which the bandwidth is determined according to an unoccupied state of a line. If services such as a TV phone, a video letter, and video streaming are provided in a full scale, development of information transfer service with an assigned minimum guaranteed bandwidth and an assigned maximum allowable bandwidth also to general terminal users is expected.

In FIG. 15, a plurality of connection lines L70-1 to L70-m of subscriber homes 70-1 to 70-m are multiplexed by a concentrator 80-1 coupled to a concentrator 81, and connected to a wide area network 800 via the concentrator 81. Similarly, a plurality of connection lines L71-1 to L71-m of subscriber homes 71-1 to 71-m are multiplexed by a concentrator 80-m to connect to a concentrator 81. If the traffic shaper function of the invention is applied to each of the concentrators 80-1, 80-m, and 81, the bandwidth control according to the minimum guaranteed bandwidth and the maximum allowable bandwidth assigned to each subscriber or the priority class can be performed on packet traffic of each subscriber.

According to the invention, by granting the packet transmission right to a buffer memory whose level count value is the closest to the threshold, the minimum guaranteed bandwidth is guaranteed to each of traffic, and the traffic shaping over the minimum guaranteed bandwidth can be realized within the range of the maximum allowable bandwidth. Since the packet transmission right is granted by using the minimum guaranteed bandwidth of the traffic as a reference, an unoccupied bandwidth in an output line, which is formed in a state where the minimum guaranteed bandwidth is guaranteed to all the traffic, can be shared fairly at a ratio according to the minimum guaranteed bandwidths of traffic.

What is claimed is:

1. A traffic shaper for transferring variable-length packets received from a plurality of input ports to one output port while guaranteeing preliminarily designated minimum bandwidths, comprising:
   a plurality of buffer memories for temporarily storing the variable-length packets received from said input ports;
   a bandwidth controller for specifying a buffer memory from which a packet is to be read out; and
   a read controller for reading out a variable-length packet from a buffer memory specified by said bandwidth controller and transmitting the packet to said output port,
   said bandwidth controller comprising:
   a plurality of leaky bucket units prepared in correspondence with said buffer memories;
   a plurality of level deviation detectors each for outputting a numerical value indicative of a difference between a level count value output from each of said leaky bucket units and a threshold corresponding to the preliminarily designated minimum guaranteed bandwidth; and
   an output queue designation unit for specifying a buffer memory from which a packet is to be read out on the basis of the difference values output from said level deviation detectors, and
   each of said leaky bucket units comprising:
   a level counter for decrementing the count value at a predetermined rate; and
   level raising means for increasing the count value of said level counter, in response to reading out of a packet from a corresponding buffer memory by said read controller, by a value proportional to the length of said packet.

2. The traffic shaper according to claim 1, wherein when the level count value output from each of said leaky bucket units becomes equal to or smaller than said threshold, each of said level deviation detectors outputs zero as said difference value, and
   said output queue designation unit has a register for indicating a packet storage status in each of said buffer memories, validates output values from the level deviation detectors corresponding to the buffer memories, each of which is storing at least one packet to be read out, indicated by said register among the validated difference values, and selects one minimum value.

3. The traffic shaper according to claim 2, wherein said output queue designation unit includes means for selecting one minimum value in a round-robin manner when a plurality of difference values having the same minimum values exist in said validated difference values.

4. The traffic shaper according to claim 1, wherein each of said leaky bucket units includes means for supplying a variable unitary increment value to said level raising means, said variable unitary increment value being changed step by step according to the current level count value of said level counter, and said level raising means increases the count value of said level counter in accordance with the product of said variable unitary increment value and said packet length.

5. The traffic shaper according to claim 4, wherein the unitary increment value supplied to said level raising means increases step by step as the level count value of said level counter decreases.

6. The traffic shaper according to claim 1, wherein each of said leaky bucket units includes an increment value table for indicating unitary increment values corresponding to a plurality of level zones defined within the range of the level count values of said level counter, and said level raising means increases the count value of said level counter in accordance with the product of said packet-length and a unitary increment value read out from said increment value table according to the current level count value of said level counter.

7. The traffic shaper according to claim 6, wherein each of said plurality of leaky bucket units selectively uses one of increment value tables having different definitions of level zones in accordance with the preliminarily designated minimum guaranteed bandwidth value.

8. A traffic shaper for temporarily storing variable-length packets received from a plurality of input ports in buffer memories corresponding to the input ports, reading out the packets stored in the buffer memories, and transferring the packets to one output port while guaranteeing minimum bandwidths within maximum allowable bandwidths preliminarily designated for each of the buffer memories, comprising:

a bandwidth controller for specifying a buffer memory from which a packet is to be read out, having a plurality of leaky bucket units prepared in correspondence with said buffer memories, and an output queue designation unit for specifying a buffer memory from which a packet is to be read out, among buffer memories of which level count value is equal to or smaller than a first threshold corresponding to the preliminarily designated maximum allowable bandwidth, on the basis of difference values each indicating the difference between a level count value output from each of said leaky bucket units and a second threshold corresponding to the preliminarily designated minimum guaranteed bandwidth, and each of said leaky bucket units having:

a level counter for decrementing the count value at a predetermined rate; and level raising means for increasing the count value of said level counter, in response to reading out of a packet from a corresponding buffer memory, by a value proportional to the length of said packet.

9. The traffic shaper according to claim 8, wherein said output queue designation unit comprises:

a plurality of level deviation detectors each for outputting a difference value between the level count value output from one of said leaky bucket units and said second threshold; and a buffer selector for specifying a buffer memory from which a packet is to be read out on the basis of the difference values output from said level deviation detectors, each of said level deviation detectors outputs zero as said difference value when the level count value output from the leaky bucket units becomes equal to or smaller than said second threshold, and said buffer selector validates difference values output from level deviation detectors corresponding to buffer memories each of which is storing at least one packet to be read out, and selects one minimum value among the validated difference values.

10. The traffic shaper according to claim 9, wherein said buffer selector selects one minimum value in a round-robin manner when a plurality of same minimum values exist in said validated difference values.

11. The traffic shaper according to claim 8, wherein each of said leaky bucket units includes means for supplying a variable unitary increment value, which increases step by step as the level count value of said level counter decreases, to said level raising means, and said level raising means increases the count value of said level counter in accordance with the product of said variable unitary increment value and said packet length.

12. The traffic shaper according to claim 8, wherein each of said plurality of leaky bucket units includes an increment value table for indicating different unitary increment values corresponding to a plurality of level zones defined within the range of the level count values of said level counter, and said level raising means increases the count value of said level counter in accordance with the product of said packet length and a unitary increment value corresponding to the current level count value of said level counter in said increment value table.

13. The traffic shaper according to claim 12, wherein each of said plurality of leaky bucket units selectively uses one of increment value tables having different definitions of level zones in accordance with the preliminarily designated minimum guaranteed bandwidths.

14. A bandwidth controller for reading out variable-length packets from a plurality of buffer memories while guaranteeing a minimum bandwidth preliminarily designated for each buffer memory, comprising:

a plurality of leaky bucket units prepared in correspondence with said buffer memories;

an output queue designation unit for specifying a buffer memory from which a packet is to be read out, on the basis of difference values each indicating the difference between a level count value output from one of said leaky bucket units and a threshold corresponding to a minimum guaranteed bandwidth preliminarily designated for each buffer memory; and a read controller for reading out one variable-length packet from a buffer memory specified by said output queue designation unit, each of said leaky bucket units having:

a level counter for decrementing the count value at a predetermined rate; and level raising means for increasing the count value of said level counter, in response to reading out of a packet from a corresponding buffer memory, by a value proportional to the length of said packet, and said level raising means for increasing the count value of said level counter in accordance with the product of a variable unitary increment value and a packet length, said variable unitary increment value increasing step by step as the level count value of said level counter decreases.

15. The bandwidth controller according to claim 14, wherein each of said leaky bucket units has an increment value table for indicating unitary increment values corresponding to a plurality of level zones defined within the range of the level count values of said level counter, the threshold corresponding to the minimum guaranteed band width designated for the buffer memory being positioned almost in the center of one of said level zones, and wherein said level raising means increases the count value of said level counter in accordance with the product of said packet length and a unitary increment value corresponding to the current level count value of said level counter in said table.

16. A traffic shaper for transferring variable-length packets received from a plurality of input ports to one output port while guaranteeing preliminarily designated minimum bandwidths, comprising:

a plurality of buffer memories for temporarily storing the variable-length packets received from said input ports;

a bandwidth controller for specifying a buffer memory from which a packet is to be read out; and a read controller for reading out one variable-length packet from the buffer memory specified by said bandwidth controller and transmitting the packet to said output port, wherein said bandwidth controller includes means for assigning an unoccupied bandwidth in said output port to each of said buffer memories in accordance with a rate of the minimum bandwidth designated to each of said buffer memories, and said read control means reads out packets from each of said buffer memories in a transmission rate equal to or higher than the minimum guaranteed bandwidth in response to the assigning of said unoccupied bandwidth from said bandwidth controller.

* * * * *